United States Patent [19]

Stemmle et al.

[11] 3,963,345

[45] June 15, 1976

[54] PRE-COLLATION COPYING

[75] Inventors: Denis J. Stemmle, Williamson; Morton Silverberg, Rochester, both of N.Y.

[73] Assignee: Xerox Corporation, Stamford, Conn.

[22] Filed: Mar. 24, 1975

[21] Appl. No.: 560,756

[52] U.S. Cl. .............................. 355/50; 242/67.4; 271/3; 355/76
[51] Int. Cl.² .................. G03B 27/48; G03B 27/50; G03B 27/62; G03B 27/64
[58] Field of Search .................... 355/3 R, 8, 14, 23, 355/47–51, 75, 76; 271/3; 242/67.3 R, 67.4

[56] References Cited
UNITED STATES PATENTS

| | | | |
|---|---|---|---|
| 2,948,207 | 8/1960 | Amsel et al. | 355/84 |
| 3,079,839 | 3/1963 | Lohner et al. | 355/76 X |
| 3,147,679 | 9/1964 | Schaffert | 355/3 R |
| 3,182,549 | 5/1965 | Thompson et al. | 355/76 X |
| 3,451,754 | 6/1969 | Prew | 355/76 X |
| 3,499,710 | 3/1970 | Sahley | 355/50 X |
| 3,642,370 | 2/1972 | Meredith et al. | 355/8 X |
| 3,862,802 | 1/1975 | Till | 355/23 |

FOREIGN PATENTS OR APPLICATIONS

1,111,875    5/1968    United Kingdom

*Primary Examiner*—Richard A. Wintercorn

[57] ABSTRACT

Automatic pre-collation document copying in which the documents are loaded upon, and automatically recirculated by, an elongate, windable, air permiable document holding web. These documents are primarily retained between the turns of a spaced pair of oppositely wound scrolls of the web without the use of a vacuum. The web has a minor intermediate unwound segment extending between the two web scrolls where the documents are intermittently exposed for copying by appropriate optical systems for projecting the document images onto a xerographic drum or belt or other imaging surface. The documents are retained on this intermediate segment by a vacuum applied to the opposite side of the web. A drive is provided for recirculatingly winding and unwinding the web between one web scroll and the other so as to recirculatingly expose, in sequence, the individual documents on the web as they appear on the unwound intermediate web vacuum segment. The documents are thereby exposed in the pre-collated order in which they are loaded onto the web, or/and the reverse to produce correspondingly pre-collated copy sheets.

4 Claims, 8 Drawing Figures

PRE-COLLATION COPYING

This invention relates to document reproduction systems, and more particularly to an improved reproduction system for producing pre-collated copy sets from sets of individual document sheets by recirculating the documents on a web on which they are stored.

When multiple copies are made from a multi-page set of original documents, the multi-page copies thereof must be separated into separate copy sets in proper order, which is known as collation. For example, for 10 copies of a five page document set the copies should end up in 10 separate copy sets, each copy set having one copy of pages 1 through 5 therein, in that order. It will also be appreciated that for duplex copies that two of the copy pages may be on opposite sides of the same copy sheet, which makes collation more difficult. Once the copies are collated into copy sets they can then be stapled, bound, or otherwise finished. Such a copy set may be a copy of a multiple page memo, report, brief, magazine, book, etc.

The collation of multiple copy sets is known to be performable manually or automatically, in two general ways. In one way, which may be called "post-collation", the original document pages need only be handled once for copying. All of the desired number of copies are made in one copying operation from each document page. The copies thus come out of the reproducer in uncollated form, e.g., 10 copies of page 1 together, followed by 10 copies of page 2, etc. The post-collation can then be provided in a number of well known ways by mechanical sorters or collators, which separate the copy pages into separate copy set bins. Each copy sheet of a given document page must be individually placed in a separate bin. Then the copy of the next domument page must be placed adjacent the preceding copy page in each bin until a copy set is completed in each bin.

The conventional post-collation process has a number of disadvantages. It requires considerable mechanical handling of the copy sheets, with consequent potential jams and copy sheet loses. The sorters or collators require considerable space, weight, and expense in order to provide a sufficiently large capacity. A conventional sorter or collator has a limited maximum capacity for the number of copy sets, equal only to the number of its bins. Thus, a single 20 bin sorter can only collate for 20 copies of a document set and additional copies would be uncollated unless recopying, with document recirculation, is provided, or unless "limitless" sorting is provided by switching between two or more bin sets and unloading them during the copying run. Also, the maximum size of the copy sets, including the maximum number of copy sheets which can be in each copy set, is limited by the size of the individual bins.

The use of sorters or collators can be completely avoided by "pre-collation", a different way of performing output collation. In pre-collation the originals are serially recirculated, and one copy made per page per recirculation, by the number of times corresponding to the number of copies desired. Thus, the copy sheets come out of the reproducing apparatus individually, but already pre-collated into order, i.e., in sets. Another term for a pre-collation system is a "document recirculation system", since the documents must be recirculated in some manner in order to allow their repeated sequential copying. Starting it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a five page book, one copy at a time would be made of each document page in this order: pages 1, 2, 3, 4, 5; 1, 2, 3, 4, 5, etc., repeated a total of 10 times to make 10 copy sets. Alternatively, for bi-directional copying the copying sequence can be 1, 2, 3, 4, 5; 5, 4, 3, 2, 1; 1, 2, 3, 4, 5, etc..

In pre-collation copying, all copies may be collected in a single large output tray rather than in different bins. A relatively simple off-setting or staggering device may be provided for the output tray, if desired, to displace each copy set slightly from the next, for set recognition and separate removal. Note U.S. Pat. No. 3,630,607 issued Dec. 28, 1971, to H. Korn et al. U.S. patent application Ser. No. 319,839, filed Dec. 29, 1972, by Denis J. Stemmle is also noted in this regard, in a web scroll post-collation system.

With pre-collation copying, there is no limit on the number of copy sets. Operator unloading is not required. The side of each copy set is limited only by the document page capacity of the document recirculation system. Completed sets can be removed from the output tray while the others are still being produced. A complete first set is produced from the first copies, and is immediately usable for proofing. On-line finishing can be provided in which each copy set is bound while the next set is being produced. U.S. Pat. Nos. 3,793,016 and 3,794,550 issued Feb. 19, and Feb. 26, 1974 are noted for a finished system. They both state that, "It is especially suitable for direct on-line binding of pre-collated output sets from high speed machines." Job recovery (replacement of copy sheets lost by jams or misfeeds) is simplified with pre-collation since only the one copy set in which pages are lost need be corrected.

A disadvantage of most previously known pre-collation copying systems, manual or automatic, is that they require more handling of the original documents than post-collation copying systems, since each document must be repeatedly moved in and out of a copying station, (such as on and off the platen of a xerographic copier) by the number of times equal to the number of copies desired. This repeated movement and handling of the documents is time consuming and may reduce the overall effective copying speed of the reproduction system. It may also result in damage to the document sheets. The risk of document damage increases in proportion to the number of document recirculations. Paper document sheets which are thinner than average, or irregular in size, or which have aged, or which have tears or curls or fastening means therein, are particularly susceptible to damage or destruction by repeated handling in conventional type document transport systems, where the document may be subjected to relative motion with respect to feed rollers, belts, wheels, gates or the like. Also, there may be a psychological resistance by an operator to placing a document inside a mechanism where it cannot be seen and is being operated on. Thus, manual document separation, movement and placement is preferable to the extent practical. Yet for utilizing the higher speed copying capabilities of modern reproducing apparatus, fully manual document pre-collation copying is generally insufficiently rapid or accurate.

The present invention is directed to solving the above and other problems in multiple set document copying by providing a pre-collation system in which document recirculation for multiple serial copying is provided while retaining document sheets on an elongate web. The web can be wound in document retaining storage scrolls for minimizing document handling and maximizing document protection, and the web can be wound and unwound between the document retaining scrolls for the multiple pre-collation document copying.

In the automatic document handling system for making pre-collated copy sets disclosed herein the repeated collated imaging of a set of original documents is provided by placing and retaining the documents on an elongate windable document holding web. This web is wound between two spaced web scrolls positioned and wound so as to retain the document between the turns of the web scrolls on both of the scrolls. The web is repeatedly wound and unwound from one scroll to the other (recirculated) to repeatedly expose individual documents on the web in an exposed portion of the web extending between the scrolls. The documents are optically exposed on the web between the scrolls for copying, and a simple optics arrangement may be utilized.

The documents in the presently disclosed system need not contact any other object than the retaining web itself and are held between the layers of the web scroll. Thus, there is no substantial relative motion required at any time between a document sheet and any other object, even during recirculation. This reduces the danger of document damage greatly.

In the disclosed system, the advantages of manual initial document placement can be provided. Yet once the documents are placed on the web, all of the subsequent recirculation of the documents for pre-collation copying may be accomplished by the system itself without manual intervention. Further, the unloading of the documents can also be automatically accomplished. Thus, all of the advantages of pre-collation copying noted above can be provided, yet with minimization of the document handling disadvantages. Further, the present system is readily compatible with various automatic separating and loading systems, and only a single separating and loading operation need be performed on each document regardless of the number of copies.

As noted above, the size of individual pre-collated copy sets is limited only by the document capacity of the recirculation system. With the system disclosed herein a large number of documents can be recirculated. This number is limited only by the desired or practical maximum dimensions of the web scrolls.

Considering now some of the background, as previously noted the concept of fully manual pre-collation copying is well known, in which an operator sequentially manually makes single copies of the pages of a document set and recopies the set by the number of copy sets desired. It has also been suggested that documents may be taped end-to-end into an endless loop to be repeatedly circulated through the document scanning system of a Xerox "Copyflo" xerographic copier to provide collated output copy sets. These copying arrangements, of course, have the above-discussed document handling disadvantages, and taping or other mechanical securing is also undesirable for many documents, and may cause visible copy defects.

Some examples of previously known automatic pre-collation copying systems for document sheets are disclosed in U.S. Pat. No. 2,822,172, Feb. 4, 1958, by C. R. Mayo et al., and in German Patent No. 1,128,295, Oct. 25, 1962, by H. Rankers. In Mayo, several documents are automatically held and recirculated for serial copying a selected number of times on a large cylindrical vacuum drum. Although this does provide reduced document handling, obviously there are limitations on the document page capacity for a practical drum size, and the document drum curvature may present some focusing constraints.

Some additional subsequent patents with disclosures relating to pre-collating document sheet copying include U.S. Pat. No. 3,499,710, by L. W. Sahley, U.S. Pat. No. 3,536,320, by D. R. Derby (also teaching a vacuum feed belt) and U.S. Pat. No. 3,799,537, by H. W. Cobb. In the latter the documents are recirculated in individual carriers.

Automatic pre-collation copying of a selected number of copy sheet sets from microfiche card microimages is disclosed for example, at Cols. 30, 38, etc., of U.S. Pat. No. 3,372,627 issued Mar. 12, 1968 by T. C. Murray et al. Reel-to-reel microfilm, or automatic magnetic tape input pre-collation copying onto copy sheets is also known (e.g., the Xerox "1200" computer printer). Obviously, the recirculation without damage of film or tape rather than individual sheets, where the film is an integral unit and smaller, is generally less difficult.

Of course, it will be appreciated that outside of the field of pre-collation copying the broad concept of manually winding a web with pages thereon between scrolls for reading or copying the pages is as old as ancient Egyptian and Roman scrolls and the Torah. It is also well known to wind up check, currency or the like between web scrolls for dispensing, viewing, copying or other purposes, in other than pre-collation copying systems.

Perhaps the most pertinent prior art noted on winding a web into a scroll for document copying is U.K. Patent No. 1,111,875, published May 1, 1968, to VEB Reprotechnik Leipzig or its equivalent German Patent No. 1,281,836 or French Patent No. 1,509,647. This disclosure includes the combination of a web for storage of originals for photocopying in a scroll together with a suction box, or another web and elastrostatic forces, for holding the originals for copying on the web. It also discloses a perforated or porous web, driving the web by edge perforations, and optical scanning for belt indexing. Also of interest is U.S. Pat. No. 3,642,370 to W. H. P. Meredith et al. having a transparent web, carrying opague material, wound between reels across a document copying platen. Similarly, U.S. Pat. No. 2,948,207 by D. Amsel et al. discloses in Col. 4, etc., a series of individual items to be copied carried on a transparent band wound between feed and take-up rolls. U.S. Pat. No. 3,147,679 by R. M. Schaffert, In FIG. 4 (top) and Col. 8, lines 53–63 discloses a housing 40, hinged for access in feeding documents. Images are on a continuous web of documents 42 (or on single documents inserted and removed by hand into a feeding slot 44), for copying. U.S. Pat. No. 3,544,212 by M. Umahashi et al. discloses a copier with voucher forms on an endless belt. U.S. Pat. No. 3,072,237 by L. G. Simjian shows an automatic apparatus for storing and dispensing currency on a web scroll, with image recording means 44 thereof.

Other disclosures are noted relating to the storage or recirculation of the copy sheets using web scrolls. One is U.S. Pat. No. 3,863,802 filed Aug. 22, 1973, by H. R. Till, issued Jan. 28, 1975, and entitled, "Sheet Reversing Apparatus and a Duplex Reproducing Apparatus Employing Same". Another is pending U.S. patent application Ser. No. 319,838, filed Dec. 29, 1972, by D. J. Stemmle and entitled, "Binless Sorting Apparatus". Another is U.S. Pat. No. 1,825,885, issued Oct. 6, 1931, by J. J. Murray.

There is considerable art in the general area of web/scroll receivers, dispensers and storage devices for various articles such as business records, checks, bills, currency, etc.. These include U.S. Pat. No. 1,838,065 by J. Last and U.S. Pat. No. 3,191,882 by W. Riedel (both of which also teach removable magazines for the scrolls). Others include U.S. Pat. Nos. 2,981,492, and 3,074,663, by L. J. Simjian, and U.S. Pat. No. 3,222,057 by J. M. Couri.

Of course, various vacuum belt or electromechanical systems and materials are known for automatically holding and moving documents or film for copying. Some examples are in U.S. Pat. No. 2,462,439 by L. Thompson; U.S. Pat. No. 3,332,328 by C. F. Roth, Jr.; U.S. Pat. No. 3,430,952 by J. G. Benjamin; U.S. Pat. No. 3,554,643, by J. F. Batter, Jr. et al.; U.S. Pat. No. 3,689,150 by G. H. Northmann et al.; and in German Patents No. 446,968, June 23, 1927, by W. Fleichmann et al., and No. 1,053,310, Mar. 19, 1959, by U. Schmeidel et al.. U.S. Pat. No. 3,473,035 also uses electrostatics.

Several exemplary embodiments of the present invention are shown and described hereinbelow as incorporated into otherwise conventional exemplary xerographic apparatus and processes. Accordingly, said xerographic apparatus and processes themselves need not be described in detail herein, since various printed publications, patents and publicly used machines are available which teach details thereof to those skilled in the art. This includes flat platen scanning optics for copiers, which are disclosed herein in several embodiments in combination with the exemplary document web systems. Some examples of such optics systems are disclosed in U.S. Pat. No. 3,775,008, issued Nov. 27, 1973, (of particular interest to FIG. 1) and in U.S. Pat. No. 3,832,057 issued Aug. 27, 1974, (of particular interest to FIGS. 3–5, and 7) and in their cited references. Structures and teachings from these and all of the other references cited herein may be incorporated by reference in this specification, to the extent appropriate.

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, which are approximately to scale except where otherwise noted, and wherein:

Referring now to the drawings, FIG. 1–8, there are illustrated therein five different embodiments only as some examples of the present invention. In these embodiments the automatic document handling systems have different orientations and combinations with different exemplary xerographic (or other electrostatographic) copying systems. However, all of these embodiments provide automatic pre-collation document copying as described above in the background discussion.

Figure 2:
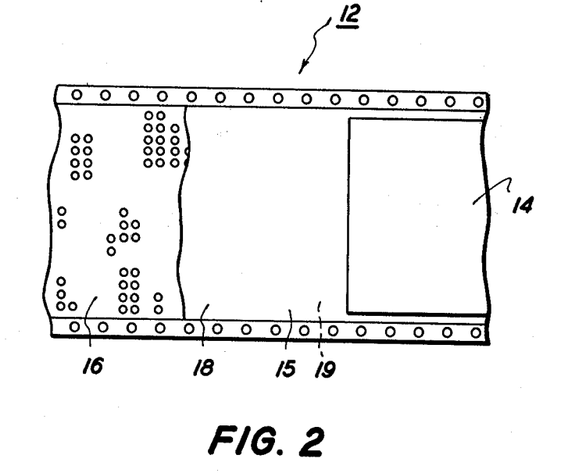
FIG. 2 is a plane view, particularly broken away, of an exemplary document handling web per se for all of the system embodiments disclosed herein.

In all of these embodiments it may be seen that the documents are loaded upon, and automatically recirculated by, an elongate windable document holding web such as is illustrated in FIG. 2. Means are provided for forming a spaced pair of oppositely wound scrolls from this web for winding up the documents loaded onto the web into these scrolls. The documents are retained between the turns of the web on both of the scrolls during the copying operation. It may be seen that the web has a minor intermediate unwound segment extending between the two web scrolls where the documents are exposed for copying by appropriate conventional optical imaging means. The document imaging means projects the document images onto a xerographic drum or belt or other imaging surface. Appropriate or conventional drive means are provided for recirculatingly winding and unwinding the web between one web scroll and the other so as to recirculatingly expose, in sequence, the individual documents on the web as they appear on the unwound intermediate web segment. The documents are thereby exposed in the pre-collated order in which they are loaded onto the web, or/and the inverse, and thus correspondingly pre-collated copy sets can be produced by the web recirculations between the scrolls. As the documents are loaded they are wound up on the web into one of the scrolls so that the documents are trapped between the web layers of the scroll. Likewise, when the web is recirculated onto the other scroll the documents may be retained in position solely by being held between the layers of the other scroll. The documents may each be exposed as they are being loaded to provide a "proof set".

In the intermediate web segment between the scrolls the documents are preferably held in position on the web by providing a web with an air permiable structure and by providing a vacuum platen and vacuum chamber on the opposite side of the web from the document retaining side. The porous web and the exposed document thereon are thereby held against the vacuum platen within the span region of the web between the scrolls. The retaining of the documents on the web in the exposed inner-scroll segment is also assisted by providing a substantially linear and planar configuration of the web between the two scrolls.

It is important to note that all of the scrolls illustrated in the Figures are oppositely wound and convoluted and allochiral. The intermediate segment of the web forms a document retaining nip on its document retaining side with each of the scrolls where the web winds into the scrolls, i.e., both of the nips are on the document retaining side of the web. Further, both of the scrolls are on the document retaining side of the web in their document recirculating position. This insures that the documents are maintained on the web on its document retaining side continuously, and that the documents are maintained only in a concave orientation on both of the scrolls (concave relative to the side of the documents being imaged).

The above is in contrast to scrolls which are not oppositely wound, as in the previously cited reference to U.K. Patent No. 1,111,875, for example, which can not satisfactorily provide document recirculation because the resulting arcuate deformation of the documents, particularly in an opposite direction of curvature, prior to their entering the scroll nip would cause the documents to strip by their own beam strength from the web rather than be retained on the web and wound up into the scroll into which the web is being wound.

Referring now in more detail to the document retaining web, one example is illustrated in FIG. 2 as a segment of such a web 12 with one of the documents 14 on its front or document carrying side 15. The web 12 here is a substrate 16 of thin, flexible, but substantially non-stretching Mylar plastic or other suitable web material. The substrate 16 is highly perforated over its major central portion to render it air permiable. Its outer edges, at each side thereof, may be perforated with suitable regularly spaced sprocket holes providing for a conventional belt pin or other drive system, as will be further described herein. (However, unperforated edges driven by friction rollers are presently preferred). The air permiable main portion of the substrate 16 may be covered by a thin layer of high friction material such as foam rubber or non-woven synthetic fiber material forming the covering layer 18 here. This covering layer 18 here is on the document carrying side 15 of the web 12 and provides the document support. It also provides the optical background against which the document 14 is optically imaged, and therefore is preferably highly reflective and which in color. This covering layer 18 may also reduce optical transmission therethrough which would cause excess imaging of the perforations in substrate 16. The surface 15 of the web provides a high friction surface relative to the document 14 to prevent document movement or sliding on the surface of the web. The web 12 may be alternatively provided by the substrate 16 without any layer 18, or with a thin coating not covering the apertures, but providing a high friction surface. The web 12 here is merely exemplary and various other single layer or composite or multi-element porous supports may be utilized.

The side 19 of the web 12 opposite the document handling side 15, i.e., the backside may be electrically conducting, if desired, for static electricity dissipation, as is known. As the web is wound into its spiral scrolls, the backside 19 of the web 12 of one layer of the scroll abuts the document carried on the adjacent scroll layer frontside 15. The dissipation of the static charge on the web backside 19 is intended to prevent the document from being electrostatically attracted to the web backside when it is unwound. This electrical conductivity may be provided, for example, by a doping or layer of graphite, zinc oxide, or other conductive material. The document retaining side 15 of the web may be insulative for certain webs so that electrostatic charges which are produced or induced thereon can be retained and utilized to provide electrostatic retention forces on documents to this side of the web. Alternatively, this side may also be conductive.

Since the covering layer 18 is subjected to some contamination by the pulling of air through both the layer 18 and the substrate 16 from the vacuum applied thereto, it will be appreciated that suitable or conventional cleaning means may be provided for the web. One such cleaning means would be to apply positive air pressure through a small segment of the backside of the web 12 during the regular or special recirculations of the web 12 between scrolls, or a vacuum to the frontside, so as to blow particulate materials off of the covering layer 18.

Figure 1:
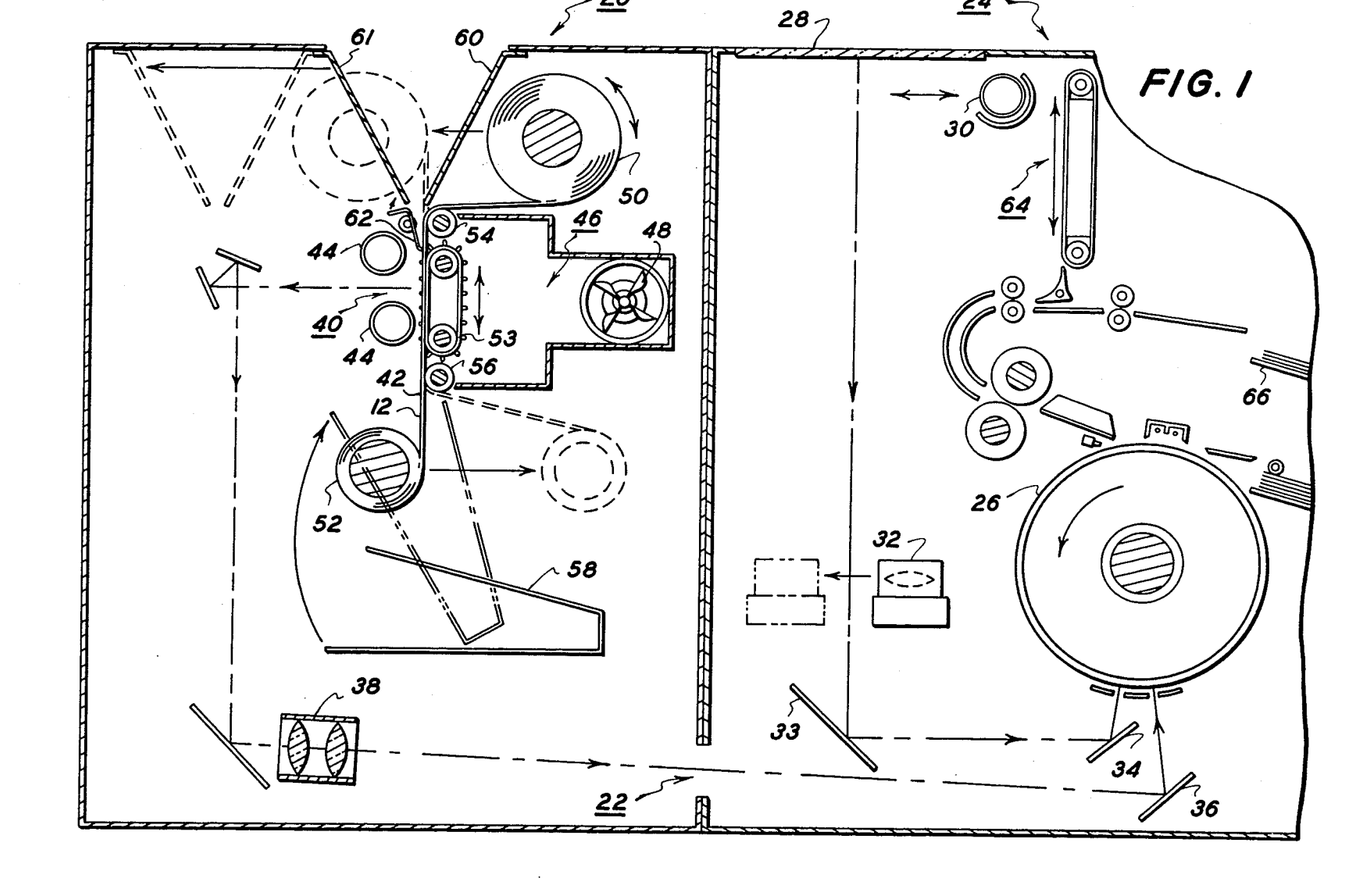
FIG. 1 is a side view of an exemplary automatic document handling system of a xerographic copying apparatus, in which the automatic document handling system is in a separable module.

Referring now to the embodiment of FIG. 1, it may be seen that there is shown an exemplary automatic document handling system 20 as a separate console unit operatively connected to a conventional xerographic apparatus 24 only at an optics path opening 22. For clarity, only relevant connecting portions of the xerographic apparatus 24 are illustrated. The xerographic apparatus 24 here is the Xerox Corporation "4000" copier, having a photoconductive drum 26 providing the imaging surface. The drum 26 here is imaged through two different optics paths from two different document imaging stations. One path is from a conventional stationary document platen 28, which is conventionally scanned by a lamp 30 and lens 32 and imaged through mirrors 33 and 34 onto the drum. [See U.S. Pat. No. 3,775,008 cited supra.] The other optics path is from the automatic document handling console 26 through the opening 22 and a mirror 36.

The first optics system from the platen 28 is particularly desirable for book copying or for making large numbers of copies from a single document and/or for making copies from particularly delicate and valuable documents where fully manual document handling is desired with no document movement whatsoever during imaging. Of course, various other non-moving document copying systems for documents could be utilized instead.

Referring now to the automatic document handling module 20 providing the second document imaging system through the opening 22 and mirror 36, this optical imaging system includes a lens 38 and three additional mirrors for imaging a narrow (slit) imaging area 40 extending transversely the full width of the web 12 in the planar (unwound) intermediate segment 42 of the web 12. This imaging area 40 is illuminated by a pair of flourescent lamps 44 or the like extending across the web at each side of the imaging area. The backside of the web 12 is supported in the imaging area 40 by a porous vacuum platen (which is hidden in this view). The web 12 and any document thereon passing through the imaging area 40 is held flatly against the vacuum platen by means of an integral vacuum chamber 46 evacuated by a vacuum fan 48 or the like. It may be seen that the vacuum chamber 46 is adapted to apply a vacuum to the backside of the web 12 over substantially the entire intermediate segment 42 of the web between the web scrolls. Movable auxiliary vacuum chambers (not shown) are preferably provided under the web extending the the web scroll nips at the sides of the main vacuum chamber 46 to allow for scroll movement here.

Since the web 12 arrangement here is positioned vertically, the two scrolls may be referred to as an upper scroll 50 and a lower scroll 52. Both of these scrolls are mounted on conventional reels or the like and connected to suitable take-up, tensioning or winding means for maintaining them oppositely wound at all times, but allowing the web 12 to be recirculatingly wound between the two scrolls. The scrolls are maintained under tension so that the documents are substantially tightly retained without slippage between the turns of the web forming the scroll. The driving of the web 12 and its registration and, therefore, the optical registration of the documents thereon relative to the drum 26, is provided here by a belt, tractor or "Kidder" drive 53 operating on the sprocket holes at both edges of the web 12. This web drive system 53 is connected through appropriate mechanical linkages such as a Geneva drive or other suitable drives, or is servo controlled, so as to move the web 12 in the same surface speed and direction as the outer surface of the drum 26, and in proper registration with copy sheets fed to the drum 26 for the transfer of developed images. This provides a "moving document" document-scanning imaging system in which only a small imaging area 40 need to be provided since only a thin segment of the document is being imaged instantaneously. This also reduces the required length of the intermediate segment 42, in which the document is not being held within one or the other of the scrolls and, therefore, must be supported, as by the vacuum system. The belt or web 12 may be maintained in constant tension, for example, by a separate magnetic particle slip clutch drive constantly driving each scroll reel in opposite directions, but with a torque which can be overcome (to allow unwinding from either reel) by the pin belt tractor drive 53.

The upper scroll 50 is illustrated here in its loading position. Its operating position is illustrated here by an alternate dashed outline position into which it is moved as illustrated by the arrow between its two axes positions. The upper scroll 50 is positioned in its (solid line) loading position here by being moved transversely relative to the intermediate segment 42 of the web. This provides unobstructed loading of documents onto the intermediate segment 42. That is allowed by the arcuate deformation of the upper end of the intermediate segment 42 of the web around a fixed supporting roller 54.

Conversely, the lower scroll 52 here is shown in its operating, or document recirculating, position. Its alternate or unloading position here is illustrated by the dashed outline position, into which it is moved as shown by its arrow. The movement of the lower scroll 52 into its unloading position causes the lower end of the intermediate segment 42, below the imaging area 40, to sharply arcuately deform around a second fixed roller 56. This deformation area of the web 12 is provided without vacuum being applied there. Thus, documents traveling downwardly on the intermediate segment 42 of the web will continue to move downwardly in the same plane as they were on the intermediate segment 42 due to document beam strength (and gravity), rather than follow the deformed path of the intermediate segment 42 around the roller 56 toward the displaced lower scroll 52. Thus, documents traveling on the web when it is moving toward windup on the displaced lower scroll 52 will "beam strip" from the web and fall into a document catch tray 58. The tray 58 is swung upwardly into the illustrated dashed line position to catch documents so stripped from the web. When the lower scroll 52 is moved back into its normal or document recirculating imaging position the catch tray 58 swings down to its illustrated solid line position.

It may be seen that in the document recirculating position of the automatic document handling system 20 (where the upper scroll 50 is in the dashed line position and the lower scroll 52 is in the solid line position) that the intermediate segment 42 extends linearly therebetween. In this position both of the scrolls, and both of the nips which they form with the intermediate segment, are located on the document carrying side 15 of the web 12. Thus, in the document recirculating position there is no beam stripping action on the documents at any time.

Referring now the loading of the automatic document handling system 20 of FIG. 1, it may be seen that there is provided a V-shaped input chute 60 with a small opening in its bottom closely adjacent the upper end of the intermediate segment 42 of the web. The input chute 60 and particularly the left wall 61 thereof, provides a document loading support surface extending toward the intermediate segment 42, guiding the lead edge of the document onto the web. A registration gate 62 is provided to catch the lead edge and register it at the proper position on the web and then to pivot out of the way as the web is advanced to feed the document onto the web. Pinch rolls or the like can also be used to urge the back edge of the document against the belt. The vacuum through the web provided by the vacuum chambers 46 grabs and provides the frictional retaining force holding the document on the web for integral post-registration movement.

The input chute 60 also shields the operator from direct light from the line scanning illumination lamps 44, since it extends in between the external document loading area and the imaging area 40 to form a light shield therebetween.

Since the input chute 60 here would be in the way of the operating position of the scroll 50, the chute 60 is moved out of the way to the alternate dashed position as illustrated by the arrow when the upper scroll 50 is moved to its dashed position. This is after all of the documents have been manually loaded one at a time by the operator into the input chute 60 and onto the web.

Reviewing now the operator activities for the embodiment of FIG. 1 for copying documents with the automatic document handling system 20 to provide pre-collated output copy sets, the components are positioned as illustrated in their solid line positions for document loading. The operator manually loads the original documents one at a time in serial order (pages 1, 2, 3, etc.) into the above-described loading mechanism. The web 12 is incrementally advanced from the scroll 50 toward the scroll 52 upon the loading of each document. As that occurs, each document is carried past the exposure station 40 and a copy is made therefrom through the optics system. Thus, a copy is made of each original while that original is being loaded. Thereby, upon the completion of loading of all of the originals onto the web, a proof set is already available at the copy output tray 66 of the xerographic apparatus 24. The operator may check this proof set to insure that all of the documents have been located on the web 12 in their proper position and orientation, and that the entire apparatus is operating correctly, prior to making the remainder of the desired number of copy sets.

At the completion of document loading here all of the documents will have been wound up into the lower scroll 52 and retained therein. To make any desired number of copy sets the operator merely selects appropriate conventional switches to initiate the copying automatically. The upper scroll 50 moves into its recirculation copying position, and the web 12 is repeatedly recirculatingly wound and unwound between the scrolls 50 and 52 by the number of times corresponding to the number of copy sets desired. On each copying recirculation the entire series of documents is moved past the imaging area 40 on the web and individually copied.

In the system illustrated here the copying is done as the web is being unwound from the scroll 50 onto the scroll 52 so as to provide document image movement in the same direction as the illustrated drum movement direction. Thus, a high speed rewind is provided to rewind the web back from the scroll 52 onto the scroll 50 before each web copying run. Bi-directional scanning could be provided by inserting an appropriate optical device in the optics path to optically reverse the apparent scanning direction on alternate web direction movements.

A complete individual pre-collated copy set is produced from each recirculation of the web between the scrolls carrying the documents thereon, without requiring a collator or sorter. As previously described in the introduction, the operator may provide on-line stapling or finishing either automatically or manually while the machine is continuing to make the subsequent copy sets automatically.

The documents are supported solely by the web 12 and do not contact any other structure during their recirculation and copying. On the side 15 of the intermediate segment 42 the imaged side of the document may be fully exposed with no obstructions or masking, since the document is held there invisibly by vacuum forces and by the scroll retention of any part of the document which extends into the scroll/web nip. The documents are maintained on the web with their opposite or non-imaged side continuously against the web. The documents are maintained only in a planar configuration in the intermediate segment 42, and only in a concave orientation (relative to their imaged surface) in both of the scrolls. Thus, the documents are never flexed between a concave and convex configuration. Further, the minimum scroll diameters are preferably held to approximately 13 centimeters so as to prevent excessive document curling. The maximum roll diameter is not critical except for space and inertial load requirements and a maximum diameter of 20 centimeters or greater is practical.

With the copy sheet path schematically shown in FIG. 1 for the xerographic apparatus 24, a copy sheet inverter 64 is provided so as to allow "face down" output of copy sheets onto the top of the copy sheets output tray 66 thereby maintaining proper serial collation. The sheet inverter may be any of the several well-known types.

Referring to FIG. 1, as an example, it will be appreciated that in a conventional stationary document platen scanning system, as illustrated here by the moving lamp 30 and lens 32, that an appreciable time period is required by practical dynamic load and vibration limits for the "fly-back" of this optics scanning system back to its initial start of scan position. Thus, in such systems, the rate at which copy sheets are sequentially fed to the drum 26 for image transfer must provide a time interval between documents sufficient to allow for this fly-back time. The dynamics of the drum 26 drive practically preclude changing speed during the fly-back time. However, there is no such fly-back time period requirement for the other optical system copying the documents on the moving web at the imaging area 40. Thus, for the latter, the drum and/or the copy sheet feeder may operate at a higher speed. The time sequencing and spacing between copy sheets may be shortened since no fly-back time period is required. However, if it is desired to maintain the same inter-copy image spacing on the drum 26 surface, the copy sheet feed sequence can be held the same and the web 12 slowed or stopped briefly between documents being imaged, or the documents may be loaded onto the web 12 spaced apart by a segment of empty webs between each document.

Referring now to the unloading of the automatic document handling system 20 of FIG. 1, this is accomplished automatically during the making of the last copy set of the selected number of copy sets. Upon the completion of the last rewind of the web 12 into the upper scroll 50, and before the start of the last imaging winding of the web 12 from the scroll 50 onto the lower scroll 52, the lower scroll 52 and catch tray 58 are moved as illustrated by the arrows into their dashed line positions. On the last imaging winding, as the web 12 carries each document past the imaging area 40 and then around the roller 56, each document automatically strips off of the web and falls into the catch tray 58. Thus, upon the unwinding of the web from the scroll 50 sufficiently to expose all of the documents on the web, all of these documents will also have been automatically removed into the catch tray 58, all without requiring any mechanical strippers or other potentially document-damaging mechanical contacts with any of the documents. The document removal here is accomplished during the copying recirculation run of the web, so there is no idle machine time due to unloading. Thereafter, both of the scrolls are automatically returned to their illustrated solid line positions, so as to be ready to receive the loading of another set of documents therein. Up to 50 or a hundred or more documents, varying from very light weight and thin to heavy weight paper or plastic sheets and in various sizes may be intermixed freely in any order and be fully automatically multiply copied and unloaded. The web rewind can be at five documents per second or faster.

The extent or length of the reciprocal winding and unwinding of the web 12 between the two scrolls will vary depending on the number of documents being copied, their dimensions, and the spacing which is provided between documents on the web. The machine logic may record the length of web utilized in loading the given number of documents, so that the web need only be recirculatingly driven by this length for each copy set. Alternatively, various document presence or absence sensing devices, optical or mechanical, as are well known in the art, may be utilized to detect the number and/or position of documents which have been loaded onto the web 12. It will also be appreciated that in the loading of documents that the incremental advance which is provided to the web upon the loading of each document may be varied in length, depending on the size of the document and the desired space between it and the next document. This incremental web advance upon loading may be preset in the web drive mechanism or may depend on sensing devices for sensing the position of the document edges in the direction of web movement. For copying of duplex (two sided)

originals, the odd sides may be loaded face up and copied, and the documents removed and turned over and reloaded for copying their even sides. A blank space may be left on the web for a simplex original intermixed with duplex originals, if desired, or the web sequenced instead.

Figure 3:
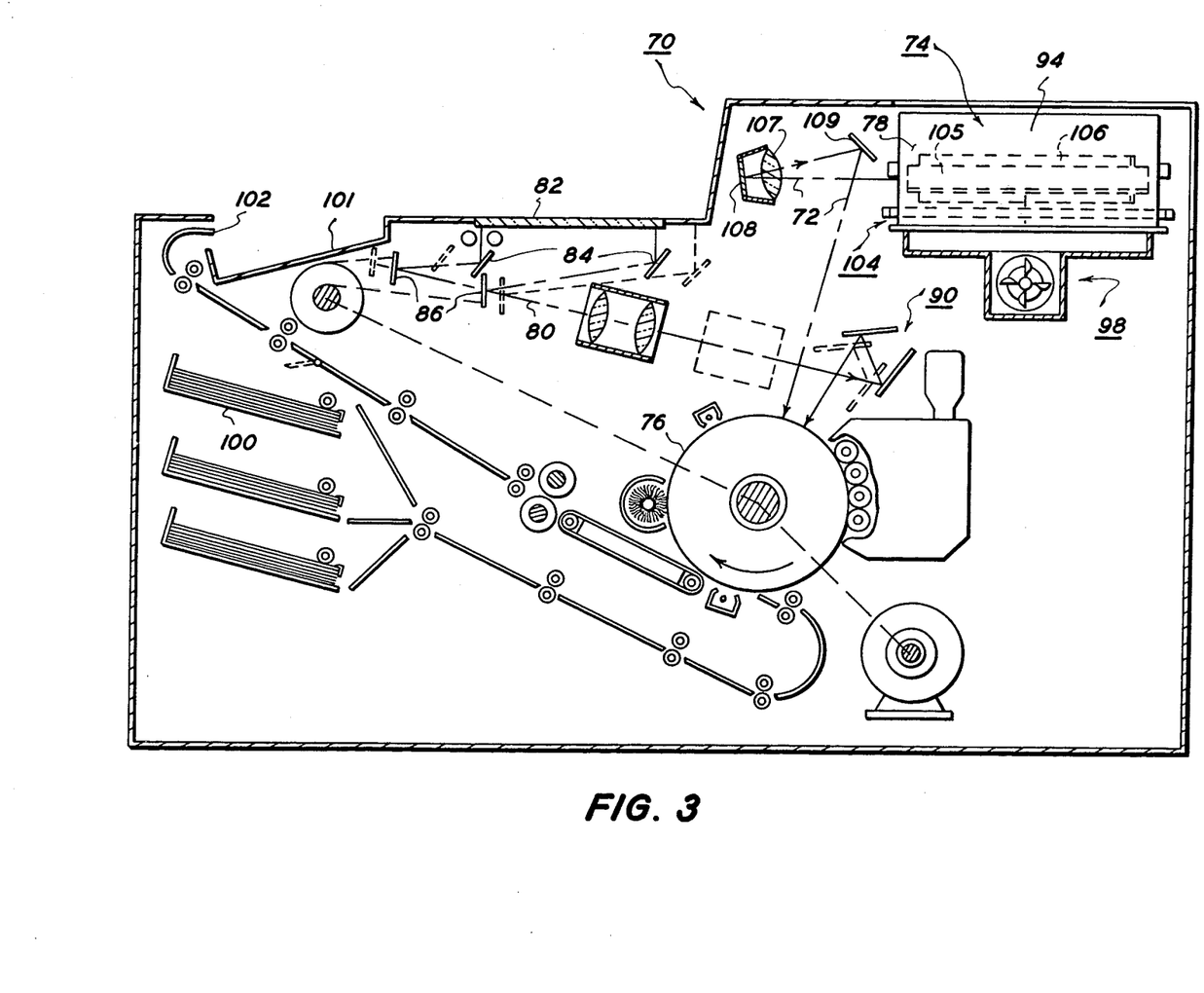
FIG. 3 is a side view of a second embodiment in accordance with the present invention.
Figure 4:
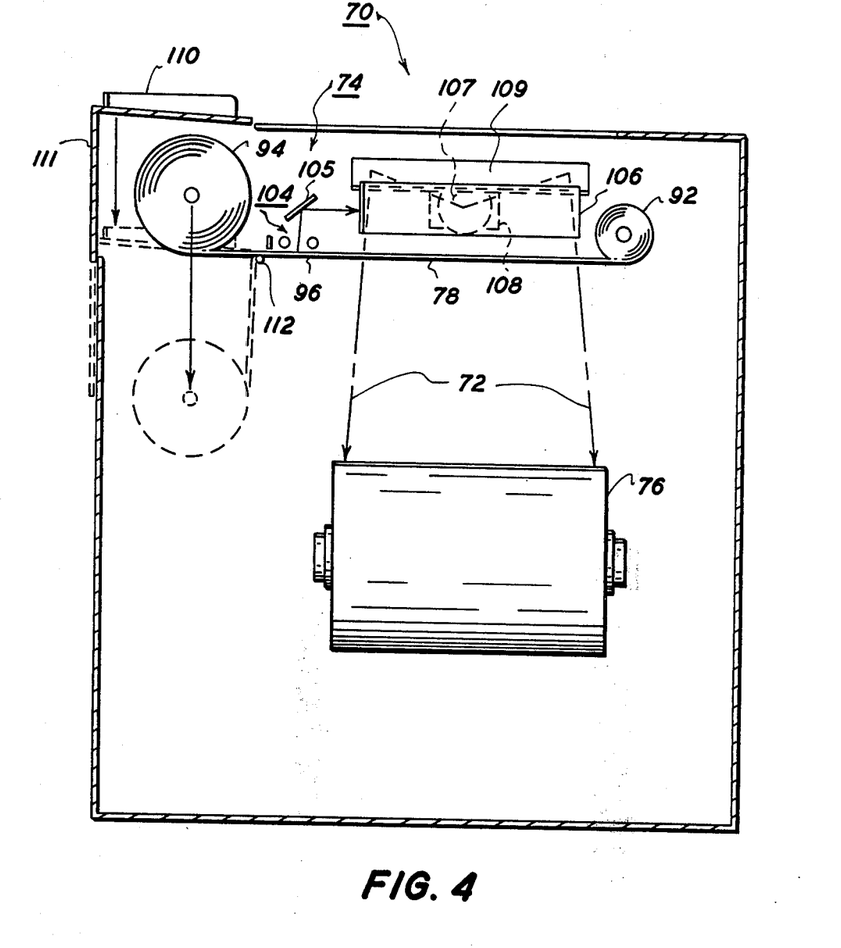
FIG. 4 is a right end view of the embodiment of FIG. 3 along the lines 4—4 of FIG. 3.
Figure 5:
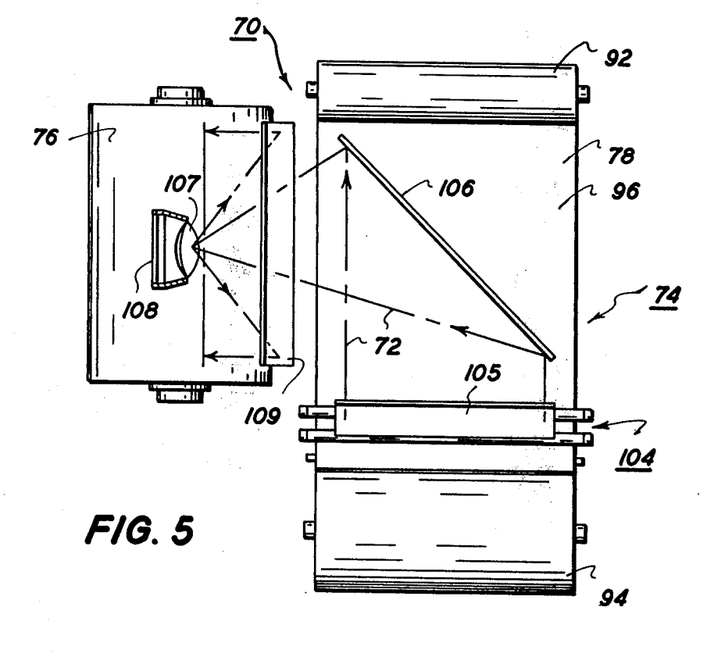
FIG. 5 is a top view of the embodiment of FIGS. 3 and 4 along the lines 5—5 of FIG. 3.

Referring now to FIGS. 3–5, it may be seen that these are respectively a side view, right end view, and top view, of another exemplary embodiment of the invention. This embodiment 70 has certain advantages over the embodiment 20 of FIG. 1. However, in this embodiment 70 the separate optics path 72 between the web-scroll automatic document handling system 74 and the xerographic drum 76 is more complicated because the direction of movement of the web 78 is at right angles to the direction of movement of the surface of the drum 76. This optics path 72 is, therefore, shown in the three separate views of FIGS. 3–5 for increased clarity. Referring to FIG. 3, it may be seen that the other optics path 80 between the stationary document copying platen 82 and the drum 76 is shown here as a known general type of scanning system. [Note the previously referenced U.S. Pat. No. 3,832,057.] The full-speed scanning mirror 84 and half-speed scanning mirror 86 and the lens unit 88 are shown with alternative dashed positions to indicate their end dwell conditions for a selected variable magnification. The other side of the optics path 80, from the lens unit 88 to the drum 76, includes a two-mirror reflective unit 90. This unit 90 moves as an integral unit to reposition its two mirror elements (note the exemplary dashed position) to change copying magnification. This movement of the mirror unit 90 is along a single axis.

Referring now in more detail to the automatic document handling unit 74 of FIGS. 3–5, it is similar in principle and operation to that disclosed in FIG. 1, but differs in orientation. Documents are placed on the web 78 and recirculated for pre-collated output copying between scrolls 92 and 94. However, in this orientation it may be seen that the intermediate section 96 of the web exposed between the two scrolls has its document carrying surface exposed uppermost and is horizontal. Also, the intermediate section 96 extends to one side of the machine at a convenient level. Thus, documents may be conveniently loaded by the operator onto the intermediate web sections 96 with gravity assisting in holding the documents onto the web as they are manually positioned thereon. The documents do not have to be manually inserted internally of the machine, i.e., the loading area is exposed and fully accessible.

Similar to FIG. 1, a vacuum system 98 in FIG. 3 is provided including a vacuum pump, vacuum chamber, and platen underlying the intermediate section 96 to apply a vacuum through the web to documents on the section 96. The web 78 drive and other features may be described for the embodiment 20 of FIG. 1.

Referring now to the xerographic copy processing, general conventional charging, exposing, developing, transferring, and cleaning stations may be seen schematically in FIG. 3. The copy sheets are fed from a duplex copying intermediate storage tray 100, or one of the two blank copy sheet trays below it, through their paper path and into the transfer station with the drum 76 then out through a conventional roll fuser in the paper path to the copy sheet output tray 101. A sheet turn around 102 is provided just prior to the output tray 101 to provide face-down stacking of the finished copy sheets in the output tray 101.

The optics path 72 of FIGS. 3–5, is between the illuminated document imaging station 104 and the imaging area on the drum 76. The imaging station 104 provides illuminated line scanning of a small area at a time of the document on the intermediate section 96 of the moving web 78. This optics path 72 includes here four mirrors and a lens. The document line image from the imaging station 104 is reflected through a first mirror 105 to a second mirror 106 which extends at 45 degrees across the web 78, and then passed through a lens 107 onto a third mirror 108 immediately behind the lens 107. The document image then reflects back through the lens 107 onto a fourth mirror 109 which reflects it onto the drum 76. FIGS. 4 and 5 are simplified views eliminating other components for clarity in showing this optics path 72.

A loading and unloading system for this embodiment 70 is illustrated in FIG. 4. The scroll 94 moves downwardly (as illustrated by the dashed position) to arcuately deflect the web after it passes the imaging station. This allows automatic ejection of documents into a document tray 110 moved into its dashed position as shown. The tray 110 is integral (on top of) a shroud or housing 111 for the scroll 94. This shroud 111 moves integrally with the scroll 94 axis. When the scroll 94 moves down to its loading/unloading position, the tray 110 moves down with it automatically into a position with one edge of the tray approximately flush with the web 78 at its deflection axis around roller 112. This tray 110 is an automatically positioned catch tray for document unloading, and also provides a continuous document loading tray for sliding documents into the web. An automatic document feeder may be provided there, if desired.

Figure 6:
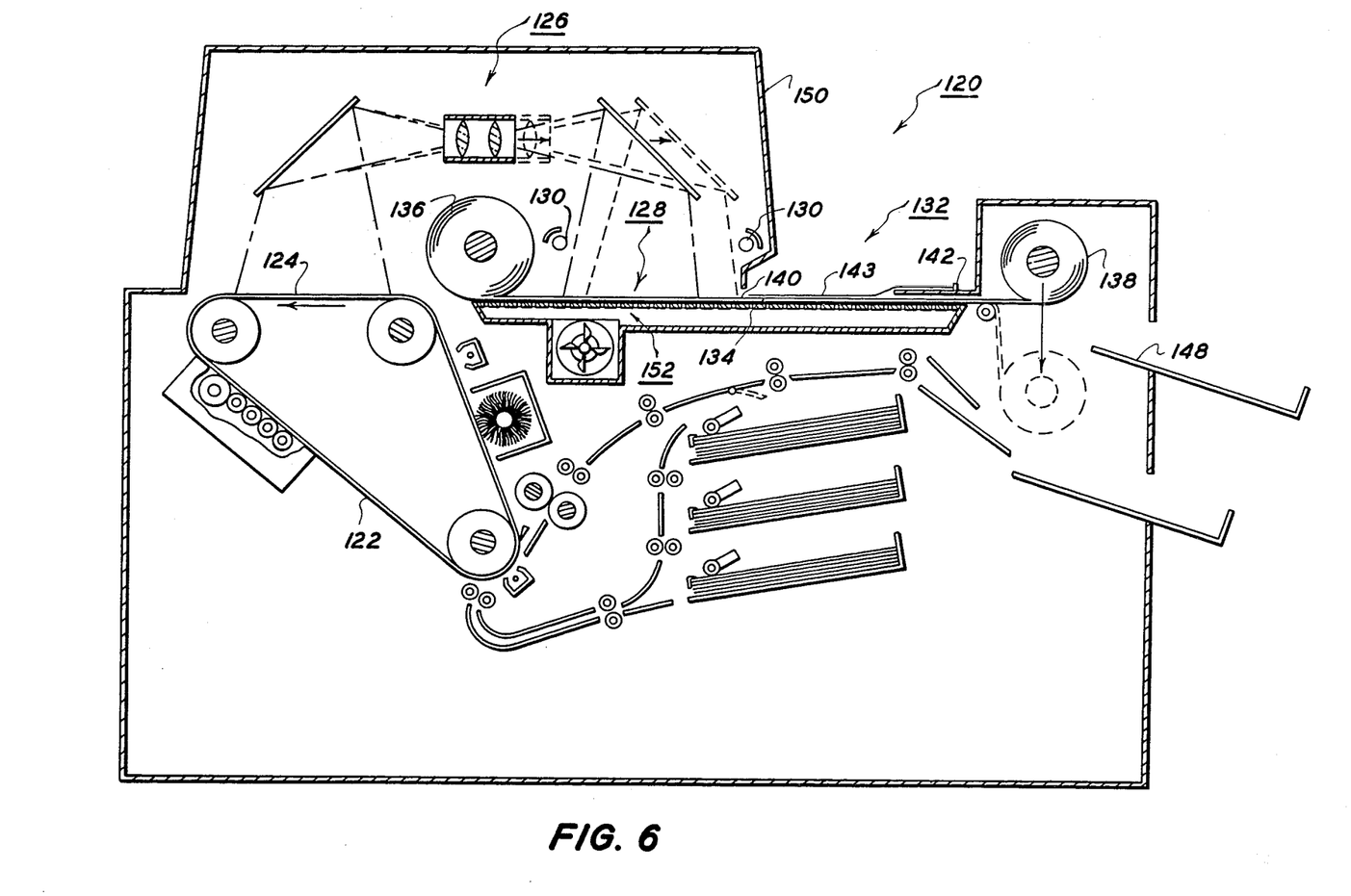
FIG. 6 is a third embodiment in a side view.

Referring now to FIG. 6, there is shown a third embodiment 120. This embodiment differs from the first two above-described embodiments in several respects. One difference is that the xerographic processor comprises a flexible photoreceptor belt 122. This type of xerographic processor is disclosed in the Xerox Corporation "9200" high-speed xerographic duplicator and in patents thereon. Accordingly, its details need not be described herein.

The configuration of the photoconductive belt 122 provides a full frame planar imaging area 124 thereon. This allows the use of a simplified optics system 126 in which the entire document is imaged at once at an imaging station 128. Illumination is preferably provided substantially instantaneously, so as to "stop" document movement, by a flash lamp illumination system 130. This full frame image is then reflected as shown through two large stationary mirrors and a lens onto the belt imaging area 124. Dashed outline positions of the two mirrors and the lens are shown to illustrate alternative positions for variable magnification of the document. Variable magnification refers primarily to variable reduction of the document image on the final sheet.

It is noted that no second or alternative optics path and stationary platen document copying station is provided in this embodiment 120 of FIG. 6. However, it will be appreciated that one can be provided, and with a simple optics arrangement.

Referring now to the automatic document handling system 132 of FIG. 6, this is somewhat similar to those previously described, particularly that of FIGS. 3–5.

However, there are significant differences in the document loading, registration, and imaging. As in the embodiment of FIGS. 3–5, the document web 134 and the scrolls 136 and 138 are shown in their copying or document recirculating position. This is also the document loading position for both of these embodiments.

The exemplary document loading arrangement and operation for loading documents onto the intermediate segment 140 of the web 134 will now be described. An exemplary document 143 is shown in the loading position. It may be seen there is a document loading edge stop 142 substantially spaced from the imaging station 128. Also, there is a connecting document support surface 144 extending from the document edge stop 142 toward the web 134. A portion of the web intermediate segment 140 adjacent the support surface 144 provides a document loading and support area in combination therewith. The support surface 144 is closely spaced above the web 134 here. The document edge stop 142 provides registration of the rear edge of the document 143 being loaded onto the web 134, while the opposing or forward edge of the same document 143 is being simultaneously directly placed on the intermediate segment 140 of the web 134. The support surface 144 provides sufficient support of the rear portion of the document off of the web to allow manual readjusting or correct positioning of the document as it is being loaded against the edge stop 142. The edge stop 142 extends linearly at right angles across the web 134. Thus, the documents may be fully manually registered and loaded on the web without any significant skew of the document relative to the direction of movement of the web.

The support surface 144 here is shown as supporting a relatively small portion of the maximum document dimensions capacity, which extends here almost to the imaging station 128. However, it will be appreciated that the support surface 144 may support a larger portion of the document and may also be mounted so as to be angled downwardly toward the web 134.

It may be seen that in contrast to the registration system provided in the embodiment of FIG. 1, that the document lead edge in FIG. 6 is not fed into any stop fingers. The web movement during loading will pull the document away from the edge stop 142 rather than drive the document against it. The edge stop 142 may be a simple fixed upstanding surface or lip relative to the support surface 144. It does not need to be retractable or movable in any manner.

As soon as the operator releases his hand from the document 143 and causes the web to advance, the vacuum and gravity attraction to the web 134 of that portion of the document which is resting on the web (rather than on the support surface 144) will carry the document off on the web 134 directly into the imaging station 128, with the trailing portion of the document sliding off of the support surface 144 onto the web and away from the edge stop 142.

The document edge stop and the support surface 144 are spaced away sufficiently from the web 134 so that they do not interact in any way with the web or documents thereon once the documents are loaded. Thus, high speed recirculating copying by web movement between the two scrolls 136 and 138 may be accomplished without any mechanical contact with the document whatsoever.

The edge position of the document may be registered or known by the machine logic relative to the web position if the web is stopped during each document loading. The document position on the web is then known for registration purposes by the machine logic for its subsequent recirculating copying at the imaging station 128.

Various automatic document unloading arrangements for documents on the web 134 may be provided. Illustrated here is an unloading arrangement wherein the scroll 138 has moved downwardly to arcuately loop web 134 around a supporting roller to provide automatic stripping of documents into a document catch tray 148 upon the winding up of the web 134 into the scroll 138. This is the same basic arrangement as previously described in other embodiments above.

Referring now to the imaging of documents which have been loaded onto the web 134, it may be seen with the arrangements shown that a light shield 150 is provided to enclose the imaging station 128 and the illumination from the flash lamps 130 within the apparatus 120. The document edge stop 142 is outside of and substantially spaced from the light shield 150 so that the entire document loading area is in full view and freely accessible by the operator. Yet the web 134 passes immediately from this document loading area into the imaging station 128 under the edge of the light shield 150, which extends toward, but is closely spaced from, the intermediate segment 140 of the web. An immediate proof set copy can be initiated as each document is loaded. In effect, the light shield 150 divides the web intermediate segment 140 into two portions, one of which is outside the light shield for document loading (with light shielding) and the other of which is within the light shield for imaging of the documents. Both of these portions of the intermediate segment 140 are in the same plane and utilize the same or similar vacuum system 152 applying a vacuum therethrough. The entire intermediate segment 140 has a desirable horizontal and upwardly facing orientation.

Another advantage of the zenon flashlamp 130 simultaneous imaging of the full document is that this type of illumination effectively optically stops the image like a high-speed camera even though the document may be moving quite rapidly on the web 134. Thus, if desired, the web 134 during copying may be continuously moved between the scrolls in either direction, i.e., the documents may be copied as they pass through the imaging station 128 from either direction. There is no problem with maintaining proper scanning direction and speed coordination with the photoreceptor belt 122, unlike the slit scanning or "flowing light image" systems of the previously described embodiments, which require smooth precise web driving accurately synchronized with the photoreceptor surface movement. However, if such bi-directional document scanning is utilized here, an inverter is needed to invert each page of alternate copy sets.

Figure 7:
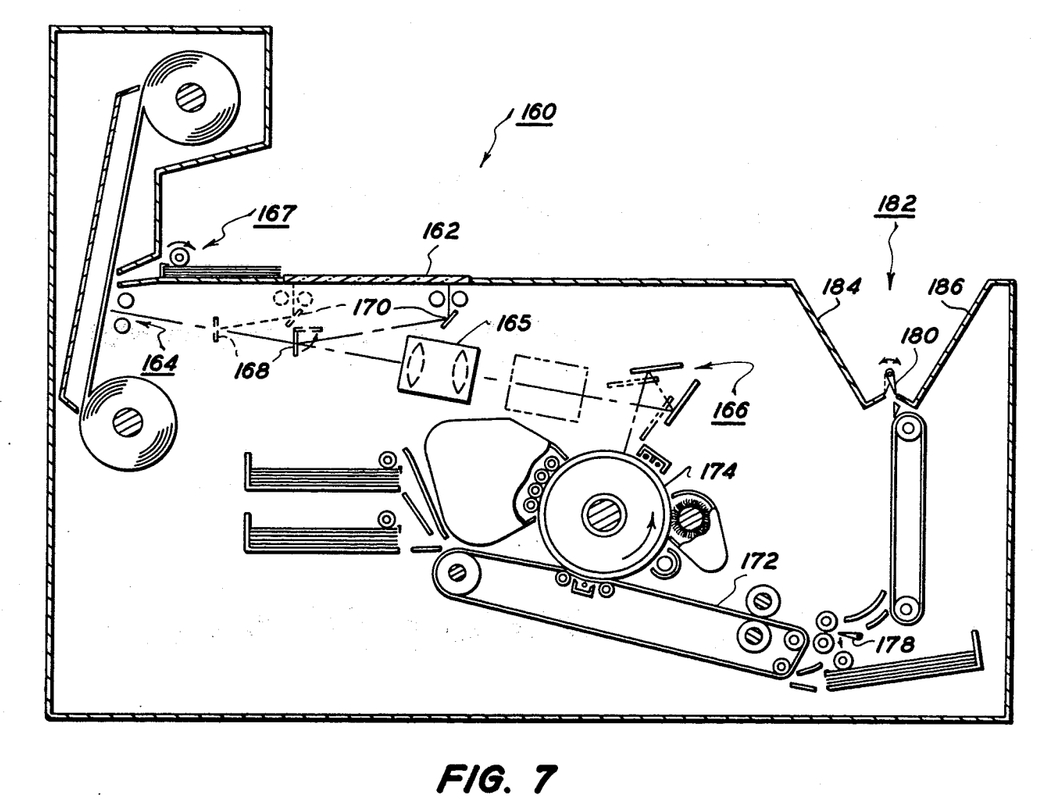
FIG. 7 is a fourth embodiment in a side view.

Referring now to the further embodiment 160 of FIG. 7, it has a web scroll document handling system orientation similar to that of FIG. 1, which therefore need not be discussed in detail other than to note that the documents are loaded therein behind the conventional stationary document copying platen 162. A fully automatic conventional document sheet separator and feeder 167 is shown for alternatively loading the documents from a stack automatically, when desired, into the web scroll document handling system. (This feature or attachment could also be provided for any of the embodiments, if desired).

In this embodiment 160, the optics system for the platen 162 shares a common lens and two common mirrors with the optics system for the automatic web/scroll document handler from its imaging station 164. That is, a portion of the optics path for the two imaging stations is shared here. Specifically, both optics paths utilize the same lens 155 and the same subsequent mirror unit 166. The mirror unit 166 is the same as the mirror unit 90 described in the embodiment of FIG. 3. These are the only two elements utilized here for the imaging of the moving document on the document web from the imaging station 164. However, when it is desired to image a document on the platen 162 instead, a mirror 168 is pivoted down into this optics path. The mirror 168 is the half-rate scanning mirror for the platen 162 in cooperation with the full-rate scanning mirror 170. The mirror 168 is illustrated in its "beginning-of-scan" position. The end of scan position for both the mirrors 168 and 170, and their optics paths from the platen 162 are illustrated by the dashed outline positions here. This type of scanning system has been discussed above in connection with the embodiment of FIG. 3.

A copy sheet transport belt 172 is provided to carry the copies from one of the copy sheet trays through the transfer station engagement with the xerographic drum 174 and then through the fuser. This may be a vacuum or electrostatic belt system. Reference may be had to U.S. Pat. No. 3,832,053 issued Aug. 27, 1974, and the references cited therein by way of example. Each copy sheet, upon exiting the transport belt 172 can be selectively deflected by a movable deflector 178 into a duplex sheet tray for later feeding back on the bottom flight of the transport belt 172 for the transfer of an image to the opposite side of the copy sheet. Otherwise, the copy sheet exits through a further transport including a sheet output deflector 180. The sheets are deposited in an upwardly opening V-shaped two-sided output tray area 182. The selected position of the output deflector 180 deflects the output sheet to either one side 184 or the other side 186 of the output tray 182. This selects either "face up" or face down output sheet stacking by this selection between the two different output bins 184 and 186 into which the copy sheets are fed. Completed copy sets may be removed from one bin without interruption while sheets are being fed into the other bin to make up the next set.

Figure 8:
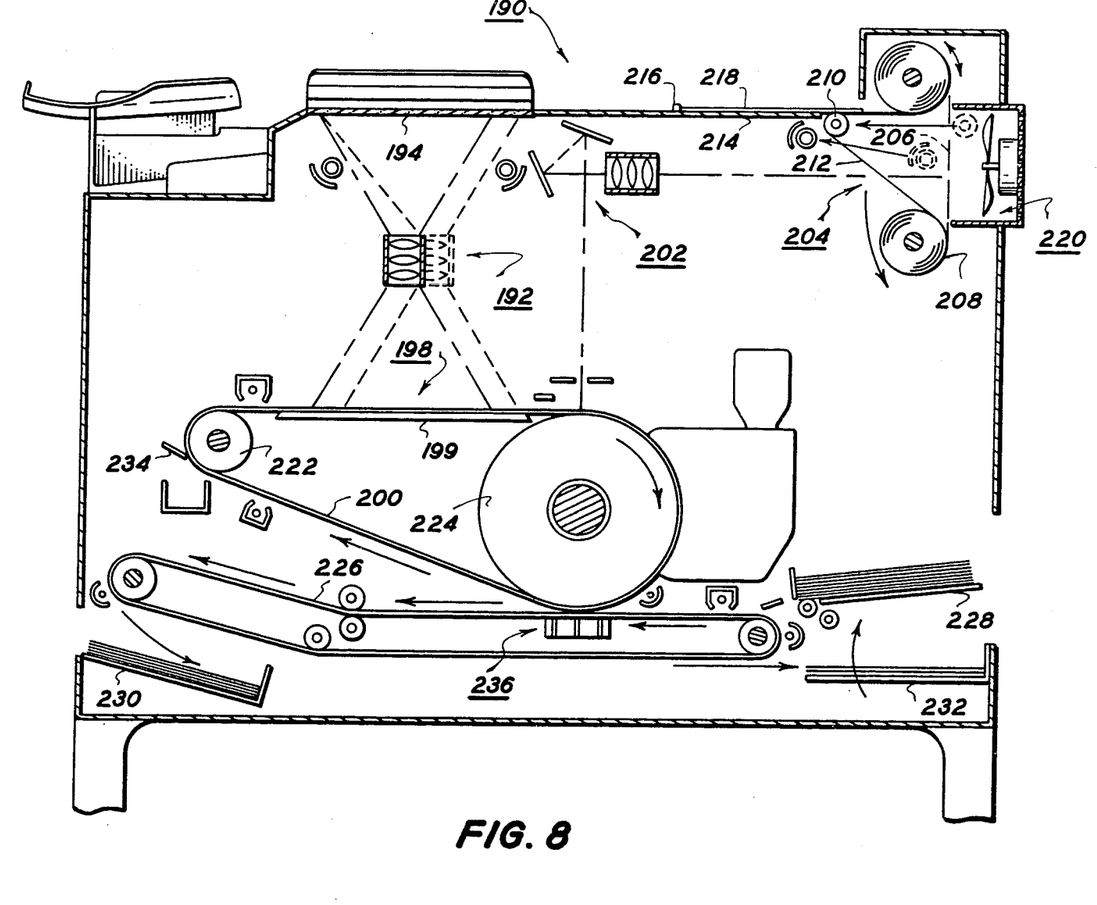
FIG. 8 is a fifth embodiment in a side view.

Referring now to FIG. 8, there is shown a further embodiment 190. In this embodiment, the separate optics system 192 for the stationary platen 194 has a zoom lens and provides a variable magnification of a full frame exposure of the platen onto a flat imaging area 198 of a photoreceptor belt 200. The platen 194 is flash illuminated so that the belt 200 does not have to be stopped for imaging of a document on the platen 194. A separate automatic or semi-automatic document handling system may be provided for the platen 194. The belt 200 is held planar in the belt imaging area 198 by an underlying rigid planar slide support 199 which may be low-friction coated and include magnetic attraction of the belt for holddown thereon.

A separate optics system 202 is provided for slit scanning of moving documents on the web-scroll automatic document handler 204 in a manner similar to that previously described above. This automatic document handling system 204 of FIG. 8, however, differs in some respects from those previously described. Here, neither of the scrolls is ever displaced relative to the intermediate segment 206 of the web 208. Rather, as illustrated, for loading and unloading of documents from the web 208 the intermediate segment is deformed. Means are provided for displacing a roller 210 from behind the normal planar document imaging location of the intermediate segment 206 (shown as a dashed line). This roller 210 is moved into the web to pull out the intermediate segment 206 into a large loop 212 with an arcuate configuration around the roller 210. It may be seen that the loop 212 on one side of the roller 210 is deformed into a horizontal position in line with a document support surface 214 and a document edge stop 216 for document loading (similar to the corresponding components 142 and 144 in FIG. 6). A document 218 thereon is illustrated. The vacuum system 220 has sides (not illustrated) extending out sufficiently to engage the sides of the loop 212 and maintain a vacuum within the extended web loop 212 for such document loading. The same (or separate) means can be provided for deforming the web 208 for document unloading into the same area. Forming a bight or loop away from the scrolls provides operator access for loading without interference from the scrolls, and allows positioning of the web for loading in one plane and for copying in another.

In the embodiment 190 of FIG. 8, the loop 212 is formed in the web intermediate segment 206 by the roller 210 only during loading and unloading, and the intermediate segment 206 normally extends linearly between the web scrolls for copying of documents thereon. It will be appreciated that a fixed smooth arcuate slide surface may be used in lieu of the roller 210. Since the documents being loaded are fed into the scroll nip without first passing through the imaging area, a "proof set" is not provided in this embodiment while loading.

Referring to the xerographic processor itself in FIG. 8, it may be seen that the photoconductive belt 200 is mounted on two support rollers 222 and 224, the larger of which is approximately the diameter of a conventional xerographic drum, thus allowing the use of conventional xerographic processing elements therearound. An electrostatic copy sheet transport belt 226 is illustrated for feeding the sheets from the copy sheet tray 228 to the transfer station (against the belt 200) and then on through a fuser into the copy sheet output tray 230. Alternatively, the copy sheets will be retained on the bottom flight of their transport belt 226 and returned to a duplex tray 232, which then pivots up to provide the recirculation of the copy sheets therein for second-side copying back on the transport belt 226. Inverted (face down) copy sheet output stacking is shown, however, collated direct face up output can be provided readily here instead. Since the documents are preferably loaded in forward serial order (1, 2, 3 . . . ) they can be copied here in reverse order upon the first web recirculation after loading. That provides collated face up output.

The illustrated blade cleaning system for the belt 200 is adjacent the small support roller 222, and the cleaning blade 234 is downwardly inclined for gravity assistance in the removal of a toner therefrom. A brush cleaning system can also be utilized. This cleaning station location is spaced a substantial distance away from the image transfer station 236 and other processing elements, for reduced toner contamination.

It may be seen that there have been disclosed herein several embodiments of an improved automatic document handling system of a copying apparatus for making multiple pre-collated copy sheet sets. While the embodiments disclosed herein are presently considered to be preferred, it will be appreciated that numerous modifications and improvements may be made therein without departing from the true spirit and scope of the invention. For example, the web drive system disclosed may be replaced by a frictional drive nip between a hard drive roller and an opposing resilient idler roll. The following claims are intended to encompass all such modifications and improvements as fall within the spirit and scope of the invention.

What is claimed is:

1. In an automatic document handling system of a copying apparatus for making pre-collated copy sheet sets by repeated collated imaging of a set of original documents, the improvement comprising:

an elongated windable document holding web;

means for forming a spaced pair of oppositely wound scrolls of said web for winding up a set of documents on said web therein and retaining said documents between turns of said web on both said web scrolls;

said web having a minor intermediate unwound segment extending between said web scrolls;

means for recirculatingly winding and unwinding said web between one said web scroll and the other said web scroll to recirculatingly expose individual documents on said intermediate segment of said web between said web scrolls in a pre-collated order; and optical imaging means for imaging documents on said intermediate segment of said web between said web scrolls for copying said documents;

wherein said web is air permiable and wherein vacuum means are provided on one side of said intermediate segment of said web for retaining documents on the opposite side of said web.

2. The document handling system of claim 1, further including means for deforming said intermediate segment of said web into a web loop for unloading documents therefrom.

3. The document handling system of claim 2, wherein said means for deforming said intermediate segment comprises a roller over which said web is run and around which said web is deformed.

4. The document handling system of claim 2, wherein vacuum means communicates with said web loop in said intermediate segment of said web to retain a document thereon with vacuum forces for loading documents onto said web.

* * * * *